J. E. BLOOM.
PROCESS AND APPARATUS FOR PREPARING BEVERAGES, AND PRODUCTS PRODUCED THEREBY.
APPLICATION FILED JUNE 1, 1914.
1,162,212.
Patented Nov. 30, 1915.
3 SHEETS—SHEET 1.
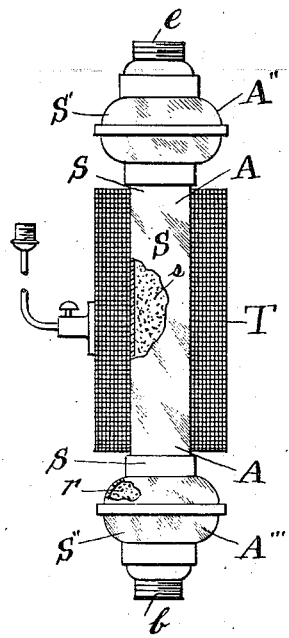
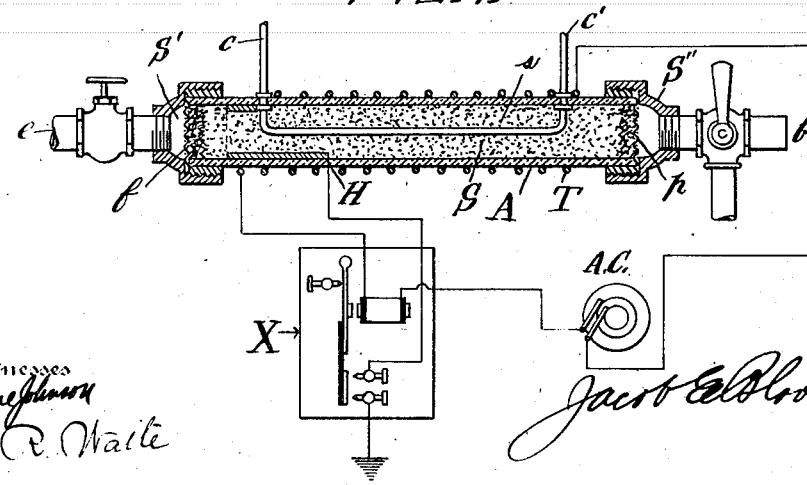

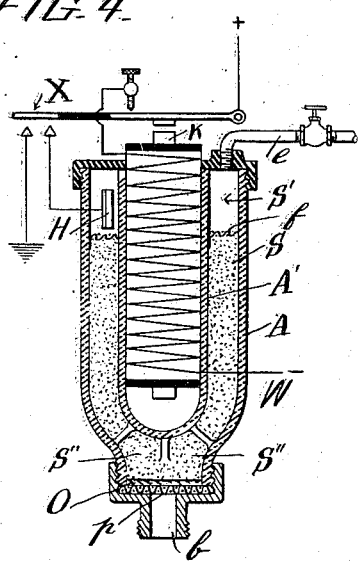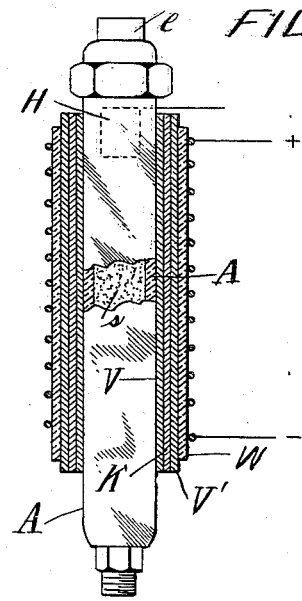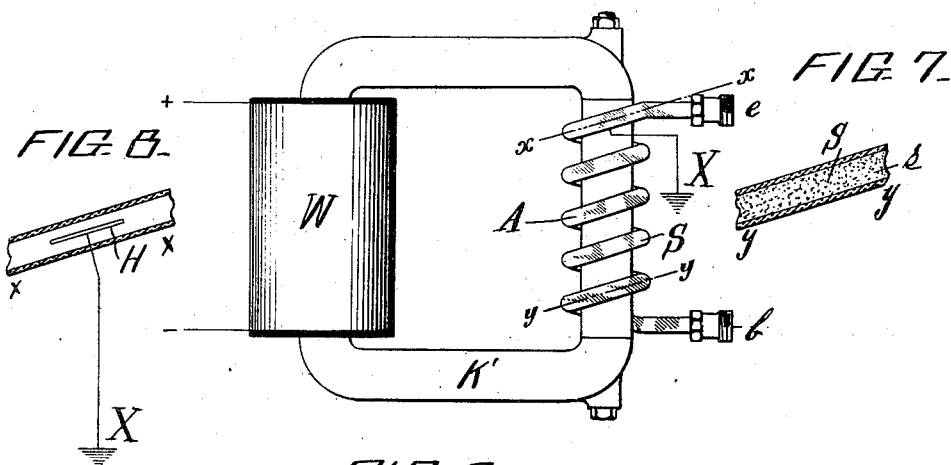

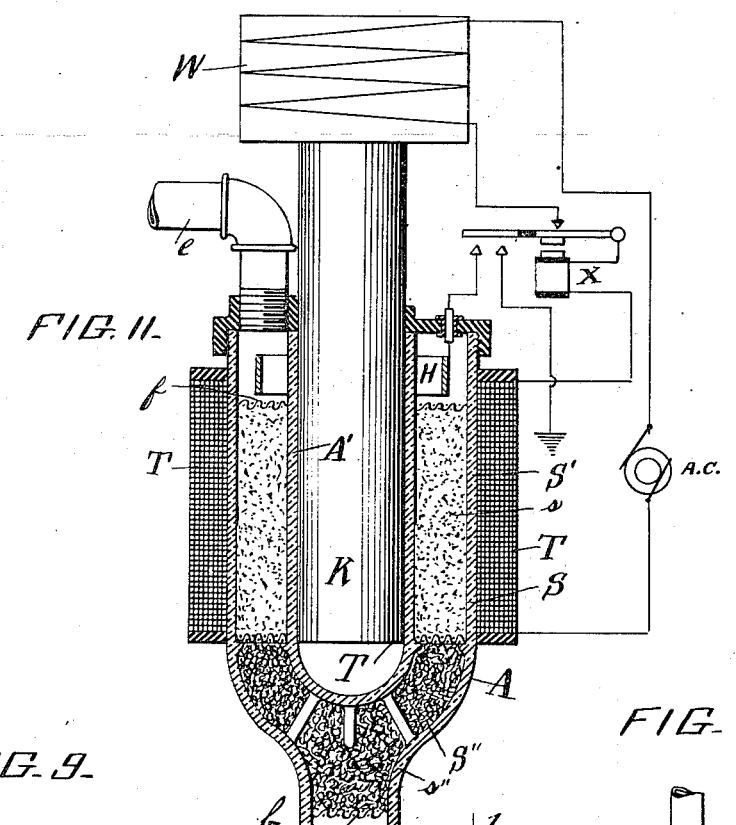
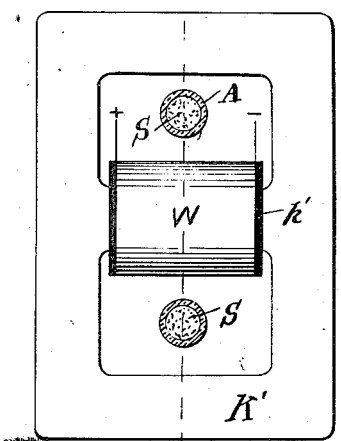
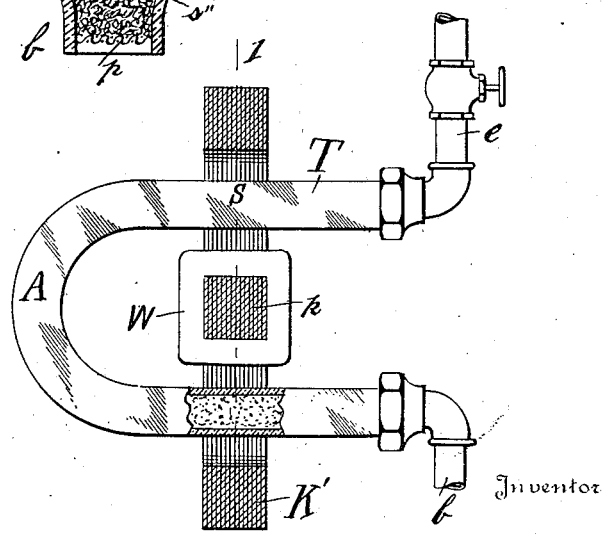

UNITED STATES PATENT OFFICE.

JACOB E. BLOOM, OF BROOKLYN, NEW YORK.

PROCESS AND APPARATUS FOR PREPARING BEVERAGES, AND PRODUCTS PRODUCED THEREBY.

1,162,212.   Specification of Letters Patent.   Patented Nov. 30, 1915.

Application filed June 1, 1914. Serial No. 842,327.

*To all whom it may concern:*

Be it known that I, JACOB E. BLOOM, a citizen of the United States, and resident of Brooklyn, in the county of Kings and State of New York, have invented a certain new and useful Process and Apparatus for Preparing Beverages, and Products Produced Thereby, of which the following is a specification.

My invention relates to improvements in the process of preparing beverages including wines and the grape-juices from which the wines are made, considered from the standpoint of electrification thereof; and the products of such improved process, and the apparatus used therefor; and the objects of my invention are to make the beverages more stable as regards non-turbidity in the trade bottle or cask; and to save time in the preparing of the finished beverage and to endow it with electric properties; and generally to improve the beverage in quality healthfulness appearance and in its "keeping" property or condition.

(1) My objects include enhancing the stability of the beverage by the removal, and generally at the time of original manufacture, of and from the beverage in whole or part, before bottling or placing in trade package, the substances causing turbidity now often or ordinarily comprised therein in states or forms of unstable solution; and which states of such substances are now ordinarily changed or subject to change by the lapse of time or by cold or heat of storage or of climate or in transportation; and which changes cause the beverage to become turbid or cloudy or so as to form sediments or deposits or precipitates or flocculations in the beverage within the bottle or cask or other package in which the beverage is now commercially marketed and thereby depreciating its market value; and it is my object to remove such prior to placing the beverage in the trade container, and by a step interposed in present processes of manufacture. The aforesaid substances are mostly those scientifically called suspensoids and suspension colloids.

(2) Another incidental object of my invention is to provide a beverage wherein the native active enzyms from the foodstuffs used in the making of the beverage, may be largely retained in solution or not destroyed; and simultaneously to remove most microbes or break down and render harmless the colonies thereof, and without the employment of heat of sterilization which ordinarily destroys active enzymes.

(3) Other objects are set forth hereinafter in connection with details of the specification.

I describe and illustrate my improvements with the species of beverage commonly known as wines, meaning wines made from grape-juices; and I especially use this as a type for that it is a matter of common knowledge among wine makers that when the finest grades of wine or the grape-juice from which the wine is made, notably red wines after due clarification and filtering in present processes of manufacture, are stored, there are found even after 2 to 4 years, sundry deposits or sediments in the casks or bottles in which the wines have been originally placed apparently perfectly clear; and in the case of grape-juice often after a very few months of storage, though stored apparently clear, the same became turbid and with precipitates on sides and bottoms of bottles in which packed.

My improvements prevent such subsequent sediments or deposits and beclouding or turbidity by the removal of the substances causing same at the time of original manufacture or before bottling; and thereby further save several years time now lost before the beverages especially wines and grape-juices made by present processes can be bottled without such ensuing deposits.

My process results not only in the removal of ordinary foreign matter, dirt, slimes and sediments as now removed by ordinary filtration, but further removes substances which cause turbidity after such ordinary filtrations give an apparently clear beverage; and which substances ordinarily come out of solution upon storage after material time or from changes of temperature; and further I remove most deleterious protozoa or other organisms, wild yeasts, lactic acid or other bacteria or break up the colonies thereof retarding further propagation and facilitating subsequent pasteurization where desired, or rendering such latter needless and which I prefer; such removal without pasteurization is especially important in wine making where a pure selected yeast is used to ferment the grape must, to insure uniform and improved product.

In order to briefly and authoritatively recite the present system of preparing wine in connection with my process step and the advantages of my improvements when applied thereto, I quote the following from Rogers and Aubert's *Industrial Chemistry of 1912;* to wit:

"*The must.*—The grape juice is a watery solution, the main constituents of which are: 1, sugar; 2, organic acids; 3, albuminoids; 4, flavoring substances; 5, pectin and mucilaginous substance; 6, mineral substances.

"1. The sugar, during fermentation, is split up into about equal parts of alcohol and carbonic acid, and only very little sugar (less than 0.15 per cent.) should be left in ordinary dry wines. A must containing 16 to 17 per cent. sugar will produce a table wine with an alcoholic strength of 8 to 8.5 per cent. by weight; musts containing less sugar produce the light ordinary wines, those containing more sugar result in the heavier high-grade wines.

"2. The organic acids, tartaric and malic, although present in comparatively small quantities are very essential constituents of the must. The tartaric acid mainly occurs in combination with potassium as tartrate (bitartrate of potassium) which is precipitated to a large extent during the fermentation. A part of the acids is also consumed by the yeast and by certain bacteria which accounts for the fact that a wine has less acidity than the corresponding must. The total acidity of must or wine is usually given as the apparent percentage of free tartaric acid.

"A must usually loses from 0.2 to 0.6 per cent. in acidity during its transformation into wine.

"3. The must can contain up to about 1 per cent. of albuminoids of which only approximately one-half remains in the wine, the rest being utilized, partly as nourishment by the yeast, and partly precipitated during the fermentation.

"5. The pectin and mucilaginous substances causing the thick consistency of the must are practically all precipitated during the fermentation as they are insoluble in dilute alcohol.

"6. In a normal must is found from 0.3 to 0.5 per cent. of mineral substances (ash) the amount of which considerably decreases during the fermentation owing to the precipitation of potassium in the form of tartar.

"The wine maker tests his must to determine approximately the sugar and acidity of an average sample. * * *

"If lacking in acidity the must can be corrected by the admixture of less ripe grapes or by the addition of tartaric acid. The addition of gypsum, which is sometimes used, especially in making red wines, has a similar effect, the gypsum reacting upon the tartar so as to form insoluble calcium tartrate and bisulfate of potassium which latter substance, unlike the tartar, remains dissolved in the wine. This method, the so-called plastering, can only be used to a limited extent, since the laws of most wine producing countries fix a maximum limit for sulfates contained in unadulterated wine.

"If the must is too rich in acids, the acidity can be reduced by dilution with water and the proper sugar content eventually restored by addition of pure cane or grape sugar. This process, known as gallizing is used to some extent in northern countries especially for white wines and is generally considered legitimate, provided it is carried out so as to actually improve, or to render marketable, the product and not with a view to unduly increase its quantity.

"*The fermentation.*—When left to itself the must will soon begin fermenting. It grows quite turbid, gas bubbles rise to the surface, the temperature rises and the viscosity and specific gravity decrease. At the same time the sweet taste gradually changes into a vinous one and a distinct flavor develops. Toward the end of the fermentation the turbidity gradually disappears and the completed fermentation leaves the young wine in a limpid state on top of a heavy sediment.

"These changes are brought about by certain microscopical plants that are always present on the skins of ripe grapes. Among them the yeasts which cause the alcoholic fermentation, splitting up sugar into alcohol and carbonic acid, are desirable and indispensable, while others such as mycoderma and various bacteria are undesirable disease germs.

"By far the most important task of the wine maker is to assist the yeast in this struggle by offering it the most favorable conditions for its activity. His aim is to make the yeast ferment the sugar as completely as possible which not only means little nourishment left for other organisms but also a high percentage of alcohol prohibiting their growth. Incomplete fermentation on the other hand results in a weak and unstable wine subject to a variety of undesirable changes." * * *

I avoid such dangers by preferably eliminating all native microbes in the must, including yeast, as hereafter explained.

"*The wine-yeasts.*—The alcoholic fermentation of the must is caused by small, usually unicellular budding fungi, mostly belonging to the different varieties of *Saccharomyces ellipsoideus*. Their principal breeding places in nature are the ripe juicy fruits where they multiply abundantly during the fall. * * *

"The yeast cells contain an enzym, the zymase, which in contact with dissolved sugar transforms it into alcohol and carbonic acid. This fermentation proceeds most satisfactorily at medium temperatures, the yeast becoming temporarily inactive at a few degrees above the freezing point of the water and permanently weakened at about 100° F. * * *

"Besides the main products of the alcoholic fermentation smaller quantities of glycerol, succinic acid and fusel oils are also produced by the yeast during fermentation.

"*Pure cultures of yeast.*—After the Danish scientist Emil Christian Hansen about twenty-five years ago, had discovered means of distinguishing between the different varieties of *Saccharomyces* and had shown the great advantage of using pure cultures, derived from one single cell, in the brewing industry, many different wine-yeasts have been isolated and studied. * * *

"This naturally led to the use of selected pure cultures of yeast for the fermentation of wine. Such cultures are kept in stock and furnished by specially equipped laboratories. In the wineries they are first propagated in a suitable quantity of boiled and cooled must, which is allowed to come into vigorous fermentation before being added to the bulk of the ordinary must. The addition of only ½ per cent. suffices to secure the predominance of the selected yeast.

"*Undesirable micro-organisms of the must.*—Among the micro-organisms occurring on the ripe grapes together with the genuine wine-yeasts the most important are: *Saccharomyces apiculatus, Mycoderma vini,* and acetic acid bacteria."

I eliminate all such by my process.

"The acetic acid bacteria, minute rods that are often united in long chains, produce acetic acid from alcohol and are, therefore, very dangerous disease germs. As little as 0.1 to 0.15 per cent. of acetic acid makes a wine decidedly 'pricked' and with a content of 0.25 per cent. most dry wines may be considered undrinkable. Exclusion of the atmospheric air protects against the growth of these bacteria.

I avoid all these diseases of wines by my improved process by eliminating all microbes from the must as hereinafter explained, and using thereafter a pure culture of yeast for fermenting; and after the fermentation is completed, I again pass the wine through my improved process.

"The white wines are produced by fermentation of grape juice that has been separated from the skins, seeds and stems.

"The fermentation is usually carried on in casks that are filled to ⅞ to 9/10 of their capacity with grape juice and the bung hole is so closed as to allow the carbonic acid to escape but no air to enter. The duration of the fermentation is from one to two weeks depending on the temperature, which usually is 60°–70° F., and on the quantity of yeast originally present. * * *

"After the fermentation is over the wine is drawn from the lees into another cask in which some sulfur has been burned to check the further activity of micro-organisms."

My improvements for removing the microbes, enables dispensing with the sulfur process.

"Before the rising temperature of the following spring causes a slight revival of the fermentation, the wine is racked off from the sediment once more, and this process repeated several times during the subsequent ripening period. At each racking an oxidation takes place resulting in precipitation of certain albuminoids and further development of the flavor, until finally the wine has become sufficiently stable to be filled into bottles.

"In the ordinary grades of wine this ripening is generally more or less forced by means of a more thorough aeration during the racking, artificial clarification, (filtration or use of finings), and, eventually pasteurization."

This so called "ripening" is accomplished most expeditiously and economically by my improvements which enables the dispensing with finings, and the oft repeated racking, and the pasteurization, and which insures the stability of the wine.

"For fining white wines isinglass is commonly used. It is soaked in water and at last in wine until nearly transparent and then vigorously beaten with some more wine eventually under addition of tartaric acid, filtered through linen and thoroughly distributed into the wine in the cask. One ounce of isinglass can generally fine 200–500 gallons of wine within 8–10 days.

"The red wines derive their characteristics from being fermented in contact with the skins of red grapes, from which they extract not only coloring matter but also a variety of other substances, especially tannins. * * *

"The temperature during fermentation of red wine is usually 65° to 85° F. * * *

"After being fermented the red wine is drawn off into casks, which, however, are only sulfured in exceptional cases, because most red wines do not need this protection and would be more or less bleached by the sulfurous acid. Red wines are ripened in practically the same way as white wines but less time and fewer rackings are required to render them sufficiently stable for bottling."

"The red wines are mostly fined with gelatin or white of egg. The gelatin is soaked in water over night, dissolved in wine by gentle heating, cooled, stirred up with some more wine and added to the cask. One ounce of gelatin is required for 50–120 galions of wine. Whites of eggs are often used to fine the better grades of red wine, one white for every 8–12 gallons. They are first beaten to a foam, pressed through a heavy linen, and stirred up with some of the wine before being added to the bulk."

It will be noted that neither the fining material, the white of egg, etc., nor the air are sterile; thereby injurious microbes are often introduced. I avoid this defect with my process whereby I am enabled to omit all finings.

"The white and red wines referred to above are all dry, i. e., practically all of their sugar having been fermented. The sweet wines and the dessert wines on the other hand contain unfermented sugar besides a high or even very high percentage of alcohol. The typical sweet wines such as 'Auslese' Rhine wine, Sauterne, or Tokay contain much sugar but their alcohol is produced by fermentation and consequently does not exceed 13 per cent. by weight. The dessert wines such as port, sherry, Madeira and Malaga are less sweet but generally contain from 15 to 20 per cent. by weight of alcohol part of which has been artificially added."

My process enables dispensing with the said artificial addition of alcohol.

"The 'Auslese' wines and Sauternes are produced from grapes attacked by a certain mold, *Botrytis cinerea*, which finds favorable conditions for its growth in a foggy, cool climate without too much rain. It causes the grapes to shrink and to partly dry up; the must being accordingly more concentrated and possessed of a peculiarly fine flavor. The fermentation is carried out with a view to produce enough alcohol to prevent further changes, but since sugar is left unfermented these wines are prone to after fermentation and as a rule need heavy sulfuring to become stable."

My process avoids this defect of "after fermentation,"—through removing microbes and active enzyms or ferments especially excessive oxydases. I dispense with the sulfuring entirely.

Considered from the standpoint of electrification and electrical properties or charges, the beverages including wines and the grape-juice from which made, comprise mostly water with dilute solutions of non-electrolytes and of electrolytes partly broken down into ions namely:—(1) pectins and mucilaginous and colloidal solutions including proteins or albuminoids and enzyms, which are not electrolytes but which can be caused to take up an electric charge by the action of the ions of the electrolytes; and which are adsorbable; many such colloids, both organic and inorganic, possess naturally an electrical charge; and into (2) electro-indifferent substances such as sugar and alcohol and which are not adsorbable; and into (3) organic acid or alkali or salt solutions and mineral constituents which are electrolytes; such dilute solutions of electrolytes are largely dissociated, nearly all of the molecules by such natural solution having broken down into ions,—largely free ions; and such under the influence of the electromotive or electrostatic force hereafter described, impart charges to the colloids by contact and are themselves again recharged.

The following are analyses of grape-must or grape-juice.

|  | Grapes. | |
| --- | --- | --- |
|  | Concord. | California. |
| Solid contents | 20.37% | 20.60% |
| Alcohol | None. | None. |
| Total acids as tartaric | 0.663% | 0.53% |
| Volatile acid | 0.023% | 0.03% |
| Grape sugar | 18.54% | 19.15% |
| Free tartaric acid | 0.025% | 0.07% |
| Ash | 0.255% | 0.19% |
| Phosphoric acid | 0.027% | 0.04% |
| Cream of tartar | 0.55% | 0.59% |

During the fermentation steps, the pectin and mucilaginous and mineral substances are mainly precipitated,—the minerals mostly as or with cream of tartar.

When a beverage such as above has been apparently clarified by present methods, it often happens that for months or years thereafter sedimentary matters deposit or turbidity and cloudiness occur therein. This is largely due to the fact that sundry colloidal substances originally in solution in the clear beverage even after its fining or filtration,—have in long time from sundry causes changed their state from one of solution to a state of suspension. Such colloids are broadly divided into two classes to wit, suspension colloids or suspensoids, and emulsion colloids or emulsoids. The retention of some of the latter only is desirable, but in a state of stable solution, because the emulsoids when assimilated are as a rule, most important constituents of the protoplasm of man. My process aims to retain some such in stable solution, but to remove those incapable of being kept in solution after long time of storage, and especially so the suspensoids.

The emulsoids, as for instance the albumin sols or organic colloids, change and assume a positive charge in the presence of small concentrations of acids, and assume a negative charge in the presence of small concentrations of alkali, and are not precipitated by small amounts of mineral salts; and the electrical properties or charges of the ions of the latter cannot alter the colloid state, but tend to insure the constancy of the colloid state of the emulsoids. But on the contrary, the suspensoids are negatively charged and never change; and the electrical properties of the ions may alter the colloid state; in some cases, the positively charged ions combine with the negatively charged suspensoids and precipitations and flocculations ensue. Again when such negatively charged suspensoids, come in contact with the positively charged surfaces of a comminuted solid adsorption material which is electropositive when interposed in the solution, there is a combination or attraction of the opposite charges—and the suspensoids are adsorbed on said surfaces or flocculate and precipitate; but not so the emulsoids in wines of an acid nature for such being positively charged are repelled from the said adsorption surfaces and thereby kept in stable solution.

With my improvements, I support, sustain, insure and increase the adsorption effect by having the same take place in an electric field, preferably of electro-magnetic induction, due to an exterior symmetrical alternating current source, and by passing the beverage through a mass of comminuted solid inert adsorption material, preferably a di-electric, placed in said field. Thereby I avail myself of, and increase the electric and surface energy effect, accepted and stated as a principle in the science of colloids, to wit: "that 'adsorption'" or increased concentration on boundary surfaces occurs inevitably in all disperse systems, with large surfaces and depends on two forms of energy inseparable from such surfaces, namely electric and surface energy; either of these factors may predominate or both may be active."

Adsorption occurs both upon the surfaces of the colloids in solution and hence their capacity for taking dissolved substances out of solution and forming precipitates; and adsorption also occurs upon the surfaces of the solid adsorption materials which I utilize. In both cases, I increase the adsorption phenomenon or property by conferring or modifying the electric charge upon the ions or particles of the solution through said exterior generated induction.

The adsorption material I employ is unoxidizable, neutral, insoluble, indestructible, preferably a non-conductor of electricity or dielectric, preferably crystalline or in finely comminuted granular form, of about No. 40 mesh; and preferably of a solid non-capillary nature, so as to be readily cleanable by a reverse stream of water or water and steam. I use comparatively large quantities or masses loosely packed of only those comminuted solid inert dielectric adsorption materials which when in contact or engagement with certain electrically charged colloids in solution adsorb such electrically, i.e. which adsorb or gather on their surfaces substances carrying electrical charges such as oppositely charged colloids; I apply the term "suitable" adsorption material as descriptive of its being adequate in said sense of being positive or negative to adsorb the adsorbable negative or positive colloid in solution. And for such I may also use the term "complementary". Also the term "selective". By "dielectric" I include non-magnetic. As an electropositive adsorber, as for grapejuices, I advantageously use such as comminuted corundum or crushed garnet; and as an electronegative adsorber, as for acid wines, I advantageously use comminuted pure quartz. When I pass the beverage through said field and adsorption material, under alternating electric stress, sundry material flocculations or precipitations or coagulations or adsorptions occur, of sundry substances previously in solution in the beverage, including sundry suspension colloids; and which ordinarily are the substances causing turbidity and cloudiness in such beverages as wines and grape-juices.

The alternating electromotive force causes the natural ions to charge the colloids or non-electrolytic particles with which they come in contact;—sundry of those colloids, or ions and colloids thereby oppositely charged, unite and coagulations or flocculations or concentrations ensue, especially of suspensoid colloids which are not amphoteric; again other colloids thus charged are adsorbed on the surface of the oppositely charged adsorption material; again other colloids and particles thus charged are repelled and freed from the molecules previously holding same in solution, and thereafter are adsorbed or unite with ions or colloids or particles of opposite sign, and flocculation and precipitations ensue; again many of the emulsoid colloids which are amphoteric are thereby caused to acquire a most stable and constant or fixed state, or condition through contact with similarly charged ions, which repel the same—and as a consequence precipitation or flocculation of such emulsoids is avoided and such may continue in solution an indefinite time, or at least for a materially longer time than the emulsoids would otherwise have continued in solution,—such time varying with sundry conditions of temperature, heat and cold, changes of storage conditions, exposure to light and other forces, and also varying with different solutions. In colloidal solutions like above there is usually a difference of electric potential between the particle or globule and the exterior fluid, due to polarization at the interface.

"The most remarkable effects of change of surface tension are those produced by what is called electric polarization of the surface". Extremely small variations of the electromotive force produce sensible changes in the surface tension; and this action is reversible in that increase of the area of surface of contact causes a faint appreciable electric action or polarization. My use of the solid adsorption material aids in attaining such end through increase of the area of surface of contact.

"The particles of the majority of these colloid solutions are electrically charged; and which properly has a material bearing on surface tension effects, on stability of colloidal solutions,—on the contact difference of potential between liquids and solids immersed therein (such as my adsorption material) and on the movements of colloidal particles in or under the influence of an induced electrical field."

"If the solution is basic or tends to break up so as to leave a free base active as with most grape-juices, the colloidal emulsion particles are positively charged; and if the solution is acidic, or tends to break up so as to leave a free acid active, as with the acid wines, the emulsoids are negatively charged."

When in the electric field described i. e. when an exteriorly alternating induced electromotive force is introduced with a very low frequency, or an electrostatic charge is brought within reach of a colloid and a difference of potential arises, the particles especially suspensoids have their charges neutralized by the adsorption of the oppositely charged ions—and at the isoelectric point where the charge becomes zero, the colloids, especially suspensoids, coagulate.

It is a principle of adsorption that: "if the sign of the charge on a surface is of opposite sign to that of ions or of colloidal particles in the liquid phase, the deposition of the latter on the surface will be facilitated; but the contrary when of the same sign."

I prefer the adsorption material to be non-magnetic and preferably a dielectric, yet such is not essential; it must be inert or neutral. And, in order to retain the above described charges upon the emulsoids to the end that same shall continue in stable solution, I use an electrode within the interior of the vessel holding the adsorption material and in contact with the passing beverage and in electrical connection with an insulated ground wire having an interrupter which automatically breaks the earth connection with each negative alternation of each cycle of the symmetrical alternating current where electropositive adsorption material is used, and with each positive alternation when electronegative adsorption material is used.

In general, I attain my improvements in present processes of making the beverages, by interpolating therein or using an additional step or steps to those now used in present processes, and which I call the electric adsorption step; and which consists in treating the wine and grape-juice before or after or both before and after fermentation, or other beverage as now made or the liquids thereof during present process of manufacture, prior to the finishing thereof or the placing in trade barrels, casks or bottles as follows: by passing same under low pressure rapidly in a few seconds and within a minute through finely comminuted solid neutral inert preferably dielectric and non-magnetic adsorption material held in suitable dielectric or insulated vessels or tubes and subjected therein to induced bipolar or multipolar electric or electrostatic and electromagnetic stress or field or flux, or a combination of such fields induced preferably by a symmetrical alternating current or currents preferably of a polyphase system though I may also use the single phase system; with currents of low frequency preferably about sixteen or the commercial twenty-five cycles; and of moderate amperage preferably about ten to twenty-five amperes; and of either very low or very high voltages and with means of attemperating the adsorption material and the passing beverage to between 98° F. and 176° F., preferably to about 130 degrees F. And in some cases in lieu of induced means, I use similar alternating currents between inert electrode terminals within the adsorption materials or vessels holding same, such being the system or type embodied in a separate application for patent, being in part an extension hereof, with improvements. And after said treatment and passage I preferably maintain said liquid under insulated conditions.

I prefer to use an A. C. having a low voltage, such that the voltage of the induced field shall be about one and a half volts or less than the average decomposition voltage of the electrolytes in the beverage.

Where I use the term "pressure" above and elsewhere herein, I include also the pressure due to suction or vacuum.

As a current source to produce my said electric fields, I prefer to use symmetrical alternating currents preferably of polyphase system preferably generated by an A. C. generator or dynamo. I may also use currents of greater frequency than 16 cycles especially the commercial frequency of 25 cycles but in such cases there is more heating effect upon the passing beverages and cooling attemperating means must be used.

Wines and other beverages made from the same species vary in their constitution, just as grapes grown in the same fields vary from year to year. Therefore no hard and fast rules can be prescribed for the details of the processes of making same, such as for the precise or above units of the currents used in my improvements.

As to the rate of passage of beverage through the electric field and adsorption material I prefer a rate of about one foot in four seconds, or such that the process is completed in a few seconds or at most in a minute; but do not restrict myself thereto.

If after the beverage has been prepared as herein described, any of the ordinary tests as to taste or quality or appearance or bouquet or turbidity or stability as regards clarification or chemical decomposition, should disclose an unsatisfactory condition or state as regards such or other advantages herein described, then the rate of treatment and of passage of the beverage can be increased or decreased, or the voltage, or amperage, or frequence, can be varied, or the kind of adsorption material, until the desired result is obtained, and the objections disappear.

My invention is illustrated in the accompanying drawings showing diagrammatically several apparatus for creating induced electric fields within insulated vessels holding the dielectric comminuted solid insoluble adsorption material in contact with which or over which the liquids pass, and which fields and adsorber cause the electrification of the liquids before and while in contact with the adsorption material as herein described.

Figure 1 is a longitudinal vertical section of a dielectric tube, holding adsorption material $s$ and encircled by a solenoid coil in connection with A. C. to create induced electromagnetic field or stress S within the tube; and having section of interior electrode H with earth connection through interrupter X in synchronism with A. C.; and dielectric pipes $c$ carrying refrigerating circulating fluids. Fig. 2 is a longitudinal section of two parallel concentric dielectric tubes A and A′ with exterior electrodes E and E′ in connection with A. C. (not shown) creating induced electrostatic field in the annular space between the tubes, holding the adsorption material $s$. Fig. 3 is a perspective view showing a construction of an adsorption tube A with electric field created by surrounding solenoid T with connection leading to A. C.; and said tube A connected with a prior vessel or tube A″ with or without adsorption material, generally without, and with an electric field; and said tube A connected with and leading to a receptacle or ensuing vessel or tube A‴ holding a larger mass of same adsorber or a different adsorber, with or without electric field. Fig. 4 is a longitudinal section of two parallel concentric dielectric tubes A and A′ with annular space between same holding adsorption material $s$ and induced electric field S′ S created by the primary W of an induction coil placed within the inner tube A′; with an interior electrode H having earth connection through interrupter X in connection with A. C. source; entrance for liquids at $e$ under pressure, and passage through adsorber $s$—$s''$ and dielectric exit $b$; with dielectric sieve or strainer plate $p$ supporting the adsorber held in place by dielectric screw piping. Fig. 5 is a perspective view of adsorption tube A and its induced electric field shown as placed in a longitudinal section of the primary of an induction coil. Fig. 6 is a longitudinal and perspective view of a closed core transformer type creating induced electric field S in coiled adsorption tube A occupying the position of the secondary coil. Fig. 7 is a detail section on line $y\ y$ of Fig. 6, showing adsorption material $s$. Fig. 8 is a detail section on line $x\ x$ of Fig. 6, showing electrode H with ground connection X through interrupter, not shown. Figs. 9 and 10 show perspective views of another closed core transformer type, creating induced electric field S in a U shaped or half turn adsorption tube A encircling the cross-arm $k'$ of Fig. 8 shaped transformer core K′ said arm being surrounded by the primary coil W, Fig. 9 being a perspective view and section on line 1—2 of Fig. 10, and Fig. 10 a perspective view and section on line 3—4 of Fig. 9. Fig. 11 is a longitudinal section and part perspective of combination of a solenoid coil T encircling outer tube A; with an open core transformer type creating induced electric field S within the annular space S between two concentric parallel dielectric tubes A and A′ in which annular space S is shown the adsorption material $s$; and showing said open-core K projecting within the inner tube A′ and having the primary coil W at the outer end of said core K in connection with the source of the A. C.; and with electrode H within said annular space S with electric connection to earth through interrupter X in synchronism with the same A. C.

I do not restrict myself to the particular apparatus and methods above illustrated or herein described to attain said induced alternating electric fields, to act, in combination with the solid adsorber in insulated tubes or vessels upon the liquids being treated. I may use any such fields produced by other methods or apparatus. I may also use an alternating electric field caused by an alternating current through the liquid in a dielectric vessel between inert electrodes therein, with adsorption material between the electrodes; and such I describe in a separate application for patent being a division of the above present application Serial No. 842327, with improvements, the said application bearing herein No. 18325 and filed March 31st 1915.

To provide one form of apparatus to attain such electric field S S′ S″ under the stress of an alternating current electro-magnetic induction, illustrated in Fig. 1, I apply a symmetrical alternating current of low intensity of about five volts and ten amperes; and of about 16 cycles, through a solenoid or coil T of insulated wire, inclosing within its cavity a cylindrical long thin tube A of glass or other dielectric or an insulated metal tube lined without and within with a dielectric; and which I call my electromagnetic induction adsorption tube or vessel whose diameter may be several inches or a foot or more. Within the cylindrical tube, I place with due means for retention, the solid inert comminuted adsorption material s, held in place by perforated dielectric baffle plate f and perforated dielectric drainage plate p,—with means for readily removing same as shown and with means or due provision of passing the beverage under pressure through such tube and adsorption material from entrance e, to exit b with 3-way cocks at e and b; and with an electrode of platinum or aluminum foil H as an inner lining in or suspended in upper portion of the tube and exteriorly connecting with a ground wire through an interrupter X which automatically makes and breaks the ground connection in synchronism with each cycle of the said alternating current A. C.; and with means of periodically cleansing said tubes and adsorption material with a stream of water or water and steam. In lieu of glass, I may use mica or glazed hard porcelain or glazed lava or other inert dielectric material for said tube. Where glass is used, I prefer Bohemian glass without lead or other mineral salts.

The heating effect of the A. C. coil is utilized to warm the adsorption material and passing beverage to between 98° F. and 130° F., the latter being a preferable temperature. Where such is materially exceeded, a cooling bath or coil of refrigerated oils or water is provided to surround the entire coil, or to circulate in dielectric tube c c' within dielectric tubes in the electric field. And conversely I may use such attemperating oils or waters warmed to about 130° F. to attain said temperatures in the passing beverages. The well known systems of attemperating coils may be used accordingly and in either case. Again in place of one single coil around the electric field of the adsorption tube, such as above, I may use two parallel coils, each of exactly similar insulated wires wound in parallel, thus forming two complete and distinct wire coils, insulated from each other but every turn of one coil adjoining the like turn of the other coil.

The two terminals of one of said coils—and such one being made preferably of flat wire—are connected together, constituting a short circuit thereof upon itself, and which I call the electrostatic coil, this, I place preferably nearest the adsorption tube. The other coil is used as and called the exciting coil, carrying the current of low voltage, and low frequency and low amperage. The exciting current sets up a similar current by induction in the parallel electrostatic coil; the effect is both electrostatic and magnetic since the two coils lie contiguous or adjacent throughout their length; and thus, to some extent the extra current due to inductance is absorbed and utilized. Thus, I attain both electrostatic and electromagnetic effect upon the passing beverage and adsorption material in the electric field. Again, in lieu of a simple exciting coil of wire such as above, I may use an arrangement which I call adsorption induction coil illustrated in Fig. 4 analogous to that of the ordinary medical induction coil with a direct current of above magnitude for the primary coil W, but omitting its secondary coil and substituting for the secondary coil two parallel cylindrical glass tubes A and A', the one within the other and having an annular space S' S S" for the electric field, between the two tubes A and A' in which space is held my adsorption material, and through which annular space due means are provided for passing the insulated beverage from e to b; the inner tube A' is adjusted to slip over or inclose the primary coil W,—which is wound around a dielectric tube which incloses the usual terminated core K of insulated laminated plates or bundle of soft iron insulated wires or a roll of thin iron insulated plate,—and whose periodical magnetism makes and breaks the primary coil current through the customary vibrator. Or said core or part thereof is preferably placed between said primary coil and said inner tube. Within said annular space or electric field S', I provide an interior electrode H such as a platinum wire or plate connected electrically with an insulated ground wire, having an insulated make and break interrupter X, to make and break the earth connection in synchronism with the break and make of the vibrator of the induction coil; i. e. with the cycles of the alternating current or alternations induced in the beverage as it passes through said annular space. Or in lieu of said two concentric parallel cylindrical glass tubes A A', Fig. 4, over the primary coil; I may provide and use a single glass tube A, Fig. 5, placed in the center of its magnetic bundle of soft iron insulated wires K constituting an annular terminated core; and place a thin dielectric cylinder or tube V' over and between the latter and the primary coil W. When the beverage is passed through said glass tube or annular space, the beverage with its naturally dissolved electrolytic substances, occupies the position of the original fixed secondary coil, but in lieu of being fixed, the beverage moves continuously under low pressure. When the current passes through the primary coil its inductive effect is increased by the periodically magnetized iron core which induces an alternating current or alternations in the passing beverage, through the effect of the make and break of the vibrator which periodically opens and closes the primary current; and in synchronism with said breaks and makes, there is a corresponding break and make in the interrupter of the ground wire connected with the interior electrode in contact with the passing beverage, as hereafter described.

As an exterior interrupter in the ground wire connected with the interior electrode over which flows the passing beverage in the induced field, I may use any of the types of interrupters or vibrators or make and break devices or such as are now used with induction coils or with magnetic call bells such as are used on A. C. lighting circuits with bell ringing transformers.

When I use the term alternating current in the passing beverage, I do not restrict myself to the ordinary meaning of the term current as traversing a wire from pole to pole or the entire beverage in the vessel; but I also include the more restricted alternations or movements to and fro of ions and adjoining electrified particles and the alternating currents between such loci, and which neutralize each other or are terminated within the beverage or on the adsorption surfaces when the positive and negative charges meet and unite,—and resulting adsorptions or flocculations occur due to the electrical action.

Though I prefer an interior electrode with connection to a ground wire having an interrupter as described and for the purpose stated so as to attain a maximum efficiency, yet even without such I attain a substantial improvement as described by the improved adsorption effect due to the electric charge. Thus, the positive adsorption surface attracts the negatively charged colloid or particle which has become so charged by an adjoining ion, and adsorption physically results when such positive and negative charges unite; and this, without any earth connection, to secure a limited amount of such adsorption or precipitation. A larger amount of such adsorbed or precipitated substances is ordinarily obtainable with such periodical connection to earth.

A further advantage of the earth connection lies in that, after the adsorption property has been exhausted,—then to attain and retain a charge on the colloids and particles of the beverage which continue in solution, the earth connection as explained is desirable so as to carry the negative or positive component to earth leaving the positive or negative charge thereon.

Again another form of the apparatus to attain such electric field under the stress of electro-magnetic induction, consists in providing what I call my open core transformer adsorption coil or vessel, to wit: a tubular coil of glass or other inert dielectric or an aluminium or steel coil lined with glass or porcelain enamel or other inert dielectric in the form of coiled piping about 3 inches diameter or more and of any convenient number of convolutions analogous to adsorption coil A in right half of Fig. 6 when combined with open core transformer K W of Fig. 11 and with one or more of the central convolutions filled with the adsorption material; and with dielectric strainer plates or diaphragms preferably of porcelain with perforations, to hold the comminuted material when the beverage is passed through; and with 3-way cocks or valves at entrance and exit and with provision for a reverse current of water or water and steam to clean the adsorption material periodically after the passage of the beverage; and on the interior of first convolution of the tubular coil, I provide an interior electrode H Fig. 8 of aluminum foil or platinum cylinder connected with the insulated wire to ground, having an exterior interrupter as above explained; and said tubular coil winds around or incloses the lower or secondary end pole of the core of a step-down open magnetic circuit A. C. transformer whose core like K in Fig. 11 consists of a laminated iron terminated bar to wit a bundle of flat iron strips or a bundle of lacquered soft fine gage iron wires, or a rod-like roll of thin iron plates—whereof the upper outer portion or half is inclosed by a primary and sole coil of fine insulated wire through which is passed a large quantity of symmetrical alternating current of low frequency preferably of 16 double reversals per second and of low voltage; and the lower portion or half of said core extends into the cavity of the tubular coil to end of the convolution holding the adsorption material; and the beverage as it passes through said coiled tube constitutes practically and takes the place of the usual secondary coil of such open magnetic circuit transformer; when the said current passes through the primary wire coil, an induced A. C. or to and fro vibration being thereby set up in the ions and particles of the beverage, caused by the alternate magnetization in the core due to the A. C. in the primary circuit, and I provide a mechanical interrupter in the ground wire from said electrode as above described adjusted to make earth connection in synchronism with the positive alternations of the alternating current, and conducting the repelled positive electrical charges to earth from any polarized or charged particles of the beverage, or the negative charge when the adsorption material is electronegative and for which the adjustment provides for earth connection with each negative alternation of each cycle of the A. C. When the adsorption material is electropositive, the opposite negative (or positive) charge of electricity upon the particles of the beverage are attracted or held by the adsorption material.

Again, I may provide an apparatus to attain an induced electric field under the stress of both electromagnetic and electrostatic induction; in other words, I may practically combine the above open core transformer K W and the annular tubes A and A' of Fig. 11, with the electrostatic system and electrodes of Fig. 2; and I thereby attain in the adsorption annular field and passing beverage by induction, electromagnetic induced electric field influenced by an electrostatic induced field. When put in operation, there is a consequent induction upon the beverage, when passed through the tubular coil; the ions and colloids thereof are vibrated or oscillated, alternately in one direction and then the other; and entire action is by induction; and with the effect like that above described.

Again, another form of open-core transformer adsorption vessel or tube, consists of the cylindrical dielectric tube above described with its inclosed adsorption material, etc.; and which tube is inclosed by, or lies within and parallel with the length of the laminated terminated core of a step-down open-magnetic-circuit A. C. transformer; this core consists of a narrow bundle of lacquered insulated soft fine-gage iron wires, with center hollow to permit the insertion or withdrawal of the adsorption tube; or the core may preferably consist of a hollow roll of thin sheet iron plate preferably silicon iron, or a very mild steel plate preferably of thickness of 0.014 inch or less, and covered with a dielectric; and the insulated plate being coiled or rolled around the adsorption tube to attain a thickness of at least one inch or more, or of at least 100 plates; and preferably so constructed that the adsorption tube can be conveniently placed within or removed from the hollow of the core.

Again, I may practically attain such electric field under the stress of both electromagnetic and magneto electric induction by using as shown in Fig. 11, in lieu of said single cylindrical tube of the said electromagnetic induction adsorption tube, a double tube i. e. two concentric dielectric tubes A and A' Fig. 11,—the outer tube A being surrounded by the A. C. coil like that of the above electromagnetic induction tube, and the inner tube A' closed at bottom inclosing the core K of an open core step-down A. C. transformer like that of the above open-core transformer adsorption vessel; and with the adsorption material s in the annular space and electric field S' S S" between the outer and inner tube.—This construction admits of large tubes both in length and diameter to meet the requirements of any desired daily or hourly capacity. I prefer interior diameters of about two foot for outer tube and about one foot for inner tube. In all such cases, I provide one interior electrode H in the passing beverage in the induced electric fields, duly connected with an insulated ground wire having a make and break interrupter X as above described which is electrically connected to operate in synchronism with the alternations of the low frequency currents used. Fig. 11 is also illustrative of a longitudinal vertical section of vessel consisting of two narrow, long and deep parallel, rectangular boxes, or parallelopipedon, insulated structures—the one placed within the other—having a long narrow space between the two boxes with dielectric linings facing each other abutting on said space, and with the adsorption material loosely packed in such space; and with means for creating the alternating electric field within said narrow space; and with means for passing the liquids through same, preferably under vacuum suction; and with a cooling attemperating fluid within the inner box. Thereby a most extensive, but yet narrow and effective alternating electric field and large mass of adsorption material can be readily attained, to handle or pass a very large volume of liquid in a limited time. Such form of vessel is also advantageously used where the alternating electric field S' S S" in said narrow space is attained by induction from the iron core of an open core transformer—the said iron core being of a shape to fit into the interior of the inner of said two boxes, A and A'. With such construction, I prefer to omit the exterior alternating current coil; and place about the exterior a cooling attemperating circulating liquid.

Again, I practically obtain an induced electric field under stress of a powerful electromagnetic induction, through what I term my closed core transformer adsorption tube or vessel, Figs. 9 and 10 or Figs. 6 and 7 and 8; by utilizing the principle of a step-down alternating current closed core transformer, whereof the primary W and sole wire windings or coil consist of numerous turns of insulated wire (connected with and carrying a symmetrical alternating current supply preferably of single phase and of low frequency of 16 cycles) around a closed laminated core K'; and the secondary of which transformer consists of the beverage while passing through an insulated single convolution or of a half turn A Fig. 10, of a dielectric tubular coil or tube holding the comminuted solid adsorption material s within the tube and through which the beverage flows continuously under low pressure while the current is passing through the primary wire coil W; or in lieu of such single turn of tube, I use a tubular dielectric adsorption coil of two or more turns A Fig. 6, insulated, and whose cavity incloses that portion of the core of transformer ordinarily surrounded by the secondary wire coil,—whose place in this case is taken by the beverage as it moves within the tube; with means (as above described for sundry other adsorption tubes) for the due passage of the beverage from an insulated vessel into and through the tube,— under low pressure; and for the due retention of the adsorption material therein; and for the attemperating of the tube or the adsorption material to attain and maintain a temperature of between 98° F. and 130° F. upon the passing beverage; and for a single interior electrode H Fig. 8 preferably platinum plate with connection to a ground wire with same interrupter; with provision for subsequent passage to and through a larger insulated dielectric adsorption vessel, and thence to a dielectric receptacle. When the A. C. is supplied to the primary winding, there is set up an alternating magnetic flux in the transformer core. This again produces the induced alternating current effect, the to and fro movements of ions, etc., as described, upon the passing beverage which constitutes or analogizes the secondary coil of the transformer. I regulate the number of turns of wire in the primary winding so as to attain a voltage of about 1 to 2 volts in the induced field; or so as to attain a secondary voltage of 4 to 5 volts in a secondary wire coil if used, of same number of turns as the coiled tube. The present systems of cooling transformers, either the air-blast or oil immersion or water cooling, are readily adaptable for use with above or other adsorption tube system; I prefer an attemperating system of the forced-oil circulation, especially of the paraffin-oils, or hydrocarbons, attemperated to between 98° F. and 130° F., or 176° F., where such latter be preferred. For such closed core transformer, I prefer an iron core built up of very numerous thin sheets of iron to constitute together a thickness of an inch or more, preferably of silicon iron comprising about $2\frac{3}{4}\%$ of silicon,—or a very mild steel,— each sheet of a thickness of about 0.014 inch or less,—and the sheets being insulated from each other; and I prefer the form of the sheet or core to be a double rectangular ring or like the figure 8 as in my illustration Fig. 9; the primary insulated coil can be wound preferably around the center cross bar $k'$ of the 8, and one or more turns of the insulated adsorption tube, wound about said center bar and primary coil and through the two holes or loops of the figure 8. A U shaped adsorption tube A Figs. 9 and 10 holding the adsorption material can be conveniently passed into and out of said two loops.

Again I may also attain my improvements by the passage of the beverage or liquid through an induced electric field S Fig. 2 under the stress of a silent electric discharge between parallel conducting tubes or plates E and E' Fig. 2 which are covered with a dielectric upon the sides facing each other and between which dielectrics the beverage passes; and holding between the dielectric surfaces the comminuted solid inert adsorption material $s$; constituting an apparatus or vessel which I call an electrostatic adsorption vessel. The said electrostatic vessel consists essentially preferably of two parallel long concentric dielectric tubes A and A' preferably cylindrical of thin glass, or glazed hard porcelain or other dielectric; or an outer tube A of steel, lined inside throughout with glass or enamel or other inert dielectric, and an inner tube A' of glass or glazed porcelain or other dielectric and whose interior or outer side is partially coated with tin foil or aluminum foil; the bottom or one end of the inner tube being sealed; and with an annular dielectric space or field S' S S'' preferably of about one half inch width between the tubes; and in such space or field and the bottom of the outer tube up to about a half inch from or below the top or end of exterior surrounding electrode, is placed a mass of comminuted solid adsorption inert material $s$, held in place by a top $f$ and a bottom strainer plate $p$ of dielectric material and in the upper or one end of such annular space or field is placed an insulated entrance pipe $e$ preferably of porcelain or other dielectric, supported by and passing through a cover $z'$ of insulating material such as ebonite, or lava, and with an exterior cutoff insulated valve or 3-way cock, and through which entrance pipe the beverage is introduced for continued passage under low exterior pressure through the insulated field and adsorption material; and within the upper end of said annular field is placed an inner ground wire electrode H, a piece of curved platinum or aluminum with which the beverage comes in contact upon entering and which electrode is connected with an insulated ground wire, which has in its circuit an exterior interrupter preferably as heretofore described, acting in synchronism with the alternating current hereafter described; and in the lower end of such field or outer tube is placed a perforated dielectric strainer plate $p$ preferably of porcelain, or lava to support and withhold the comminuted adsorption material, but permitting the passage of the beverage to and through an insulated exit pipe $b$ of porcelain, with an exterior cutoff valve or 3-way cock insulated, and through which the beverage is withdrawn from the vessel after its said passage; and the said double tube vessel is provided with two exterior metallic electrodes E and E', preferably of aluminum foil or tin foil or equivalent conducting metallic cylinders, the one electrode being placed on and closely fitting the exterior surface of the outer tube, and the other electrode closely fitting on the inner surface of the inner tube; and connecting the exterior electrodes with the terminal poles of an exterior above described symmetrical alternating current, the inner electrode preferably with the negative pole. In lieu of using concentric cylinders of smooth electrodes, I may use insulated parallel plates of large area of like metal preferably of smooth unpolished aluminum; and with two opposite plates of mica or glass or of other solid dielectric in lieu of the glass tubes aforesaid; and with a field or insulated narrow space between such two plates of glass or of other solid dielectric and which field holds the mass of adsorption material; and with means of ingress and egress of a liquid through said field.

I prefer the circular or ellipsoidal form of cross section of the electrodes and corresponding dielectric cylinders, rather than plane surfaces on account of best efficiency of mechanical construction and because thereby the lines of electrostatic flux are better concentrated in the field, upon the passing beverage. And the comminuted adsorption material in the field likewise also influence or direct the waves or lines of electrostatic flux in their action to and upon the passing beverage.

The beverage in its continuous passage through the within described electric adsorption tube or tubes meets three conditions, to wit; first:—upon entrance the beverage comes to a division or space S', Figs. 2 or 4 or 11, where it is subject to a stress in the electric field s above the adsorption materials; secondly:—then the beverage meets the adsorption material or a portion thereof which is also in the electric field; and thirdly:—then the beverage passes below or beyond the electric field and yet is passing through adsorption materials in the bottom portion of outer tube. Upon a small scale, said above three conditions may also be attained, or any one or two thereof alone by and in a series of three connected dielectric or insulated adsorption vessels or tubes A'' and A and A''', respectively, diagrammatically and in perspective shown in Fig. 3; or using any one or two thereof alone; the details of construction or electric arrangement being as indicated for other tubes and vessels herein; but showing only the solenoid T surrounding tube A and duly connected with the A. C. source; and the other vessels having means for introducing or for cutting out the current and electric field from any thereof; and for changing or placing the adsorption material in each.

Again I may omit said first electric vessel and use only passage through the said second narrow electric adsorption vessel followed by passage through the said third large wide non-electric adsorption vessel; but all such are insulated. By the use of such latter, all subsequent present fine filtration methods are advantageously dispensed with, and for the reason that the adsorption material will withhold or filter out the flocculated precipitated substances causing turbidity: and moreover thereby, the retention of electric charges on the ions and emulsoids will be the more effectually safe-guarded, and the emulsoids are more apt to continue in stable solution, in the absence of further and other disturbing conditions.

The electric charging of the passing beverage when passed through the induced electric field takes place with enormous velocity as with conductors of the first class, whereas the ions move very slowly relatively; but there are numerous free ions already present in such beverages, due to mere solution or dissociation irrespective of such charging, and the ions carry a very great charge. There is no closed current present; and practically no material electrolysis or chemical decomposition; the entire movement of ions or particles which is produced is local and the result of induction, and by convection or contact ensuing from or in connection with the induced alternating oscillations.

The beverage in the induced electric field becomes virtually analogous to a condenser plate. When the passing beverage comes in contact with the inner ground wire electrode in the electric field, then where the electrolytic contents of the beverage have become charged or polarized, the positive charges are carried to earth through above ground wire electrode, the negative charges being fixed or attracted by the electrostatic coil and by the electro-positive adsorption material; or vice versa where an electro-negative adsorption material is used. And when considered from the standpoint of electrostatic induction, the moving beverage is analogous to a condenser plate, separated by the dielectric tube from the exciting and electrostatic coil; the exterior solid electrode where such is used constituting the oppositely charged condenser plate and unto which the insulated coil also analogizes or approximates in part.

The generally accepted theory of induction pertains to and is adapted in my induction apparatus and process; to wit; "That an electrified body influences an insulated non-electrified body in such a manner that the latter becomes charged with both kinds of electricity. * * * When the influencing body is removed to a distance or otherwise ceases to act the induced charges reunite. But if however, the said induced body, while under induction, be connected with the earth for an instant, the portion of the induced charge which is repelled, flies to the earth; then, if the influencing body be removed, the insulated conductor remains charged with a kind opposite to that of the inducing charge".

In my said adaptation of said principle to obtain an electric condition or state of the beverage or of its particles in solution, through induction,—in lieu of removing the influencing body, I remove or separate from the influence of the latter, the induced body, to wit the beverage, by means of its due passage or flow onward with the one static charge or induced electromagnetic charge, after the simultaneously carrying to earth of the repelled charge upon or with each alternation of the current;—the insulated conductor in my method being the moving beverage, or the electrolytic dissolved compounds thereof. The entire vessel, the adsorption cylinder or vessel with its electric field and the passing beverage, constitute what may be called a non-electrolytic cell, there being practically no material resulting electrolysis or chemical decomposition. The passing beverage or its dissolved electrolytic compounds in effect constitute an electrode or the continuance of the sole interior metallic electrode connected with the ground wire as described.

It is now also recognized that "a charged body when set in motion spreads electromagnetic energy into the surrounding medium". In my devices or apparatus as explained, the application of the electromotive or magnetomotive or electrostatic forces electrically charges sundry particles of matter naturally inherent in the beverage or native sources thereof or ionizes contiguous atoms or molecules while passing through the induced electric field, or confers surcharges or enhanced charges upon sundry ions whose valency admits thereof; and the surcharged ions charge the suspensoids and other non-ionic particles they encounter; or ionize other atoms or molecules through surrender of the surcharges to such and the original ions resume their origina charge due to solution in the water or alcohol, and thereby electrolysis or chemical decomposition is avoided. And the alternating electromotive or magneto-motive forces further set in motion such particles and ions, merely with a to-and fro-motion or oscillation, and thereby spreads electric energy into the surrounding medium, resulting in the effects as described; and hereafter, I shall use the term "alternating electric field" to indicate any of my electric fields, having a to and fro stress or flux therein due to alternating current source; and which and the methods and the vessels, or tubes with the passing beverages are non-electrolytic,—and without resulting electrolysis and without chemical decomposition; analogizing for or in beverages, the acknowledged passage in metallic conductors, of the electrons from one atom to an adjacent atom without chemical decomposition.

When the ion which as taken up or been sur-charged with additional electrons meets the surfaces of the adsorption material it thereby may also give up one or more of such sur-charges, the latter combining with the opposite charge of the adsorption material or of a suspensoid, resulting in coagulation or adsorption, there being present sufficient electromotive force; the ion continues in solution with its original charge or electric equivalent, and hence there is no electrolysis or chemical decomposition. It also gives up or transfers such sur-charge to an atom or molecule of the solution ionizing same with an electric equivalent to a like extent as that possessed by the ions due to mere solution in the original beverage before treatment, and therefore there is no electrolysis or chemical decomposition; though sundry particles carry charges due to exterior sources of electricity and not due to the natural creation of ions by the mere natural original solution in the water of the beverage or in the subsequently created alcohol of the beverage, i. e. the original natural hydrolytic and electrolytic dissociation; the interposition of the surfaces of the adsorption material facilitate and enhance such transference of the electrical charges with the ensuing purification, clarification and stability sought in my improvement, stability not only or so much as regards mere clarification but also as against subsequent chemical decomposition.

It will be understood that the theories herein advanced are set forth in order to in part afford a possible explanation of the effects of my process; though the latter are substantially attained irrespective of said theories.

For the same scientific reasons, the symmetrical alternating currents of low frequency of the polyphase system including the two-phase current can be advantageoulsy and preferably used independently and cimilarly to attain the previously described induced electric fields in the beverage under stress of induced alternations, i. e. of electromagnetic induction. Thus, where I have described as encircling a cylindrical dielectric adsorption tube or vessel, a single wire exciting coil carrying a symmetrical A. C., I substitute therefor two independent separate wire exciting coils, insulated from each other or separated by magnetic shields or long distance air-space, each independently carrying one of the closed currents of the above two-phase current differing in phase by 180 degrees; each such will induce simultaneously in the passing beverage within said vessel a charge and an alternation, the equal and reverse of that induced by the other. Or, in lieu of said two or more currents, I use with only the one symmetrical alternating current the system of differential double winding for two exciting coils, known as the tandem differential winding. With such double multiple coil system with either one or multiple and opposing symmetrical alternating currents to attain the bipolar or multiple-polar induced electromagnetic and electrostatic field in the passing beverage, I also safely use currents of very high voltages of several thousand volts and without any substantial electrolysis or chemical decomposition in the passing beverage.

In the system of tandem differential winding, the one winding or coil is wound about one end of the cylindrical adsorption tube, and the other winding or coil around the other end, with the same resistance and same number of turns in each; and the two being electrically connected with the one A. C. circuit so as to cause the currents through the end coils to flow around the tube in opposite directions; that is to say to flow through one coil or spiral in one direction with reference to the tube, such as like the hands of a watch, and in the opposite direction in the other end coil; and with such thick magnetic shield or dielectric or air distance between the two said coils, so that there will be no magnetic inductive effective of the coils on each other, and no interference with the inductive effect of each coil on the beverage passing over the adsorption material within the tube; but the induction effect attained within the beverage by the one end coil is counteracted in the beverage by the equal and opposite inductive effect of the other end coil. Thus there are virtually two windings of same number of turns and same resistance, carrying the one current in one direction in the one coil and in the reverse or opposite direction in the other coil, throughout the parallel turns or windings; therefore the induced currents or alternations in the passing beverage will be simultaneously equal and opposite. And in the case of utilizing the polyphase system to attain such induced electric field, I substitute and use a separate wire exciting coil from each of its separate currents and independent circuits; each such coil has same number of turns and same resistance and will induce simultaneously in the passing beverage, sundry charges and alternations whereof the sum of the positive will equal the sum of the negative. Again, with my said induction adsorption vessels to attain said induced electric field especially by means of exciting coils carrying A. C. of polyphase system or two-phase currents differing in phase by 180 degrees—each current being separately carried by an independent circuit through separate exciting coils and each coil having same number of turns and equal resistance and separated from each other by material air space or magnetic shields, and which coils induce simultaneous alternations in opposition to each other and exert opposing and neutralizing influences in the electric field and within the beverage as it passes through the latter and the adsorption material. I also use in some cases, in lieu of the low voltage above stated of about one and one half volts, a very high voltage of about 8000 volts and upward, obtained by means of suitable step-up transformers, and of about ten amperes and preferably about 15 or 16 cycles; and with ample refrigerating or cooling coils to keep down the temperature of the passing beverage preferably to between 98° F. and 176° F.; and thereby I destroy many more microbes and disrupt the colonies of others not destroyed, including spores, and with resulting material attenuation of virulence and the more efficacious use of selected yeasts in subsequent fermenting operations. This, in addition to the advantage above stated as regards flocculation and adsorption of suspensoids and other particles and ensuing stable clarification.

Though I prefer to operate the process step as described to attain a temperature of 98° F. to 130° F. in the beverage when the principal aim is the adsorption of colloids as it passes over the adsorption material yet I may use the higher temperatures of 162° F. (72° C.) to 176° F. (80° C.) to more surely destroy all disease producing microorganisms, especially where the latter is the principal object or the liquid is suspected of special contamination with pathogenic germs.

It will be understood that the process of making any beverage is substantially as now pursued, with the interpolation of the step herein above described and that this step is applied generally upon the beverage as now originally finished except placing in bottles or other trade packages, and before any final present or fine filtration step and with which I prefer to dispense. Before passing the grapejuice or the fermented wine through my said electric adsorption tubes, I first remove the coarse suspensions, dirt and solid impurities by ordinary coarse filtration such as through cotton cheese-cloth or a shallow mass of coarse silica sand. I then pass the liquid through my aforesaid step or improvement. The beverage insulated exit pipe *b* finally carries the beverage from my electric adsorption tube or vessels, A, through dielectric pipes to an insulated storage receptacle, preferably glass lined, from which the beverage is eventually packed in commercial bottles, or glass lined casks, to more effectually retain its electric charges. Periodically, at least daily, after the passage of the beverage, by turning 3-way cocks, a stream of water or water and steam is introduced for cleansing purposes through said exit pipe *b*, thence through the adsorption material, and thence through said entrance pipe *e* to a water discharge pipe connected with the entrance pipe; the adsorbed particles are thus washed out, many thereof being dissolved in the wash-water.

In practising my process in the case of wine making, the grape-juice is first put through the said step;—and a select pure yeast added or used thereafter in the fermentation step; and after the fermentation the wine is put through said step; and due care being taken after the said step to pursue and complete the present process of making but only in insulated vessels.

By sterile, I mean practically free from colonies of microbes including wild yeasts and molds and protozoa, and colonies of bacteria and free from sufficient individuals thereof, which would to any appreciable extent affect the quality, taste, odor or color or the healthfulness of the beverage, or which would interfere to any appreciable extent in the fermentation steps with the desired predominant fermentation of a selected yeast.

As my process as described results in a clarified and practically sterile beverage pasteurization or further sterilization of the beverage by high heat and the using of any preservatives therein or of fining or sulfuring or oft-repeated racking and long storage are dispensed with; thereby greatly improving the quality and healthfulness of the beverage and my process ripens or gives the effect of old age and long storage, to beverages such as wines, in a very short period comparatively speaking, and is therefore most economical.

Furthermore, the step as described removes suspension colloids, metallic colloids and amorphous matter, while it leaves in stable solution the valuable emulsoid colloids, in a stable and clarified state, and with an enhanced charge, as a result of which, the resulting product is substantially free from any tendency toward turbidity or decomposition.

Though I have herein described the process as for beverages, and more particularly for wines, yet I do not restrict the same to such but apply the process and apparatus to other liquids and solutions, in the preparing, making, purifying, clarifying, sterilizing and electrical treatment thereof.

I claim:

1. In the making of beverages, the process which consists in passing the liquids under regulated pressure and temperature through a mass of comminuted, solid, insoluble adsorption material, which is electronegative in liquids of an acidic nature, and electropositive in liquids of a basic or of a neutral nature, and simultaneously subjecting the liquid to the action of an electric field from an alternating current source of regulated voltage, frequency and amperage, under insulated conditions, the liquid having a make and break electric connection to earth in synchronism with said current; and thereafter completing the making and packaging under insulated conditions.

2. In the making of beverages, the process which consists in passing the liquids under regulated pressure and temperature through a mass of comminuted, solid, insoluble adsorption material, which is electronegative in liquids of an acidic nature, and electropositive in liquids of a basic or of a neutral nature, and simultaneously subjecting the liquid to the action of an electric field from an alternating current source of regulated voltage, frequency and amperage.

3. In the making of beverages, the process which consists in passing the liquids under regulated pressure and temperature through a mass of comminuted, solid, insoluble adsorption material, which is electronegative in liquids of an acidic nature, and electropositive in liquids of a basic or of a neutral nature, and simultaneously subjecting the liquid to the action of an induced electric field from an alternating current source of regulated voltage, frequency and amperage.

4. In the preparing of beverages, the process which consists, in subjecting the liquid while in an electrified state to the action of adsorption material.

5. In the preparing of beverages, the process which consists, in subjecting the liquid while in an electrified state to the action of adsorption material, under insulated conditions.

6. In the preparing of beverages, the process which consists in subjecting the liquid to the influence of an alternating electric field while in contact with comminuted insoluble solid dielectric adsorption material.

7. In the preparing of beverages, the process which consists in subjecting the liquid to the influence of an alternating electric field while in contact with comminuted insoluble solid dielectric adsorption material, under insulated conditions.

8. In the preparing of beverages, the process which consists in subjecting the liquid while in engagement with comminuted solid insoluble dielectric inert adsorption material, to the influence of an electric field from alternating current source, the liquid having a make and break electric connection to earth in synchronism with said alternating current.

9. In the preparing of beverages, the process which consists in subjecting the liquid while in engagement with comminuted solid insoluble dielectric inert adsorption material, under insulated conditions, to the influence of an electric field from alternating current source, the liquid having a make and break electric connection to earth in synchronism with said alternating current.

10. In the preparing of beverages, the process which consists in subjecting the liquid to the influence of an alternating induced electric field while in contact with comminuted insoluble solid dielectric adsorption material.

11. In the making of wines including grapejuice used in the making, the process which consists in subjecting the liquid to the influence of an alternating electric field while in contact with comminuted insoluble solid adsorption material.

12. In the preparing of beverages, the process which consists in subjecting the liquid to the influence of an alternating electric stress from alternating current while in engagement with comminuted solid insoluble adsorption material, and thereafter repeating the said step with adsorption material of an electric sign opposite to that thus previously used.

13. In the preparing of beverages, the process which consists in subjecting the liquid to the influence of an induced alternating electric stress from alternating current while in engagement with comminuted solid insoluble adsorption material, and thereafter repeating the said step with adsorption material of an electric sign opposite to that thus previously used.

14. In the making of wines, the process which consists in subjecting the liquid before and after the fermentation step therein, to the influence of an induced alternating electric stress while in engagement with comminuted insoluble solid dielectric adsorption material.

15. In the making of wines, the process which consists in subjecting the liquid before and after the fermentation, to contact with a comminuted insoluble solid dielectric adsorption material, in an induced electric field from alternating current source, under insulated conditions, the liquid having a make and break connection to earth in synchronism with said current.

16. In the making of wines, the process which consists in subjecting the liquid before and after the fermentation, to contact with a comminuted insoluble solid adsorption material, in an induced electric field from alternating current source, under insulated conditions, the liquid having a make and break connection to earth in synchronism with said current; and thereafter repeating said step with adsorption material of opposite sign; and thereafter completing the manufacture and packaging under insulated conditions.

17. In the preparing of beverages, the process which consists in subjecting such liquid under insulated conditions, and in contact with comminuted solid insoluble electrically-acting adsorption material, to the influence of combined multipolar induced electric fields from polyphase alternating current source.

18. In the preparing of beverages, the process which consists in passing the liquids under regulated pressure and temperature and insulated conditions, through a mass of comminuted, solid, insoluble electrically-acting adsorption material, said material being electronegative in liquids of an acidic nature, and electropositive in liquids of a basic or of a neutral nature, and simultaneously subjecting the liquid to the action of combined fields from polyphase alternating current source of regulated voltage, frequency and amperage, the liquid having a make and break electric connection to earth in synchronism with said current; and thereafter conducting further treatments under insulated conditions.

19. In the treatment of beverages, the process which consists in subjecting the beverage to the influence of an alternating electric field while in contact with a comminuted solid insoluble adsorption material having an electrical charge, when immersed in said beverage, opposite to that of the colloids adsorbable thereby from said beverage.

20. The process of treating beverages containing adsorbable colloidal constituents, which comprises, subjecting the same to the influence of an alternating electric field in the presence of a comminuted solid insoluble adsorption material.

21. The process of treating beverages containing adsorbable colloidal constituents, which comprises passing the same through a mass of suitable solid insoluble comminuted adsorption material, and subjecting the same during such passage to the influence of an alternating electric field.

22. The process of treating beverages containing adsorbable colloidal constituents, which comprises passing the same through a mass of suitable comminuted solid insoluble adsorption material in a non-conducting container, and subjecting the same during such passage to the influence of an alternating electric field.

23. In the making of beverages, the process of passing the beverage under low pressure through a narrow mass of an insulated comminuted solid inert adsorption material, held in a narrow insulated dielectric vessel while subjected to an induced electric stress from an exterior symmetrical alternating current of low frequency and of low amperage and low voltage; the said adsorption material being electronegative for beverages of an acidic nature and electropositive for beverages of a basic or of a neutral nature.

24. In the making of beverages, the process of passing the beverage under low pressure through a narrow mass of an insulated comminuted solid inert adsorption material, held in a narrow insulated dielectric vessel while subjected to an induced electric stress from an exterior symmetrical alternating current source of low frequency and of low amperage and low voltage; the said adsorption material being electronegative for beverages of an acidic nature and electropositive for beverages of a basic or of a neutral nature; with an electrode within said vessel electrically connected with an insulated ground wire having an automatic insulated interrupter breaking and making earth connection in synchronism with each cycle of said alternating current.

25. In the making of beverages, the process of passing the beverage under low pressure through a narrow mass of an insulated comminuted solid inert adsorption material, held in a narrow insulated dielectric vessel while subjected to a multipolar induced electric stress from an exterior symmetrical alternating current source of low frequency and of low amperage and low voltage; the said adsorption material being an electronegative for beverages of an acidic nature and electropositive for beverages of a basic or of a neutral nature; the passing beverage being attemperated to between 98° F. and 176° F.; and after such passage of the beverage, completing present process of manufacture and of packing only in insulated dielectric vessels and containers.

26. In the making of beverages, the process of passing the liquids under low pressure through a narrow insulated dielectric vessel holding therein a narrow insulated mass of comminuted solid inert adsorption electropositive material held within an induced electric field from exterior symmetrical alternating current source of low frequency, low voltage and low amperage and thereafter passing the beverage by means of a dielectric exit pipe into a larger wider dielectric vessel holding a large mass of an insulated comminuted solid inert electronegative adsorption material; and after such passage, completing present process of manufacture and of packaging only in insulated vessels and dielectric containers.

27. In the making of beverages, the process of passing the beverage through an insulated induced electric field induced by an exterior symmetrical alternating current of low frequency and low voltage and low amperage in an insulated narrow vessel; and thereafter passing the beverage under low pressure through a narrow mass of an insulated comminuted solid inert adsorption material, and having therein a similarly induced electric field; and thence passing the beverage into an insulated receptacle.

28. In the process of making wines, the process of passing the grape-juices prior to the fermentation under low pressure, rapidly and within a minute through an insulated dielectric vessel holding therein an insulated mass of comminuted solid inert electropositive adsorption material attemperated between 98° F. and 176° F. while held within an induced electric field induced by exterior symmetrical alternating currents of a polyphase system of low frequency and very high voltage and strong amperage and having an electrode from said field and passing beverage electrically connected to earth through an insulated ground wire having an interrupter automatically breaking said earth connection in synchronism with each cycle of said alternating current; and thereafter passing the insulated grape-juices to an insulated dielectric fermentation vessel for fermentation with selected yeast; and after the fermentation passing the insulated, fermented beverage under low pressure rapidly within a minute and similarly attemperated through a narrow insulated dielectric vessel holding therein an insulated mass of comminuted solid inert electronegative adsorption material held within an insulated induced electric field induced by above analogous alternating currents; and having an electrode within said field and passing beverage electrically connected to an insulated ground wire, having an interrupter automatically breaking earth connection with each cycle of said alternating current; and after such passage, completing present process of manufacture and of packing only in insulated vessels and dielectric containers.

29. In the process of making wines, the process of passing the grape-juices prior to the fermentation under low pressure, through an insulated dielectric vessel holding therein an insulated mass of comminuted solid inert electropositive adsorption material attemperated between 98° F. and 130° F. while held within an induced electric field from exterior symmetrical alternating current source of low frequency and low voltage and low amperage and having an electrode from said field and passing beverage electrically connected to earth through an insulated ground wire having an interrupter automatically breaking said earth connection in synchronism with each negative alternation of each cycle of said alternating current; and thereafter passing the insulated grape-juices to an insulated dielectric fermentation vessel; and after the fermentation passing the insulated fermented beverage under low pressure through a narrow insulated dielectric vessel holding therein an insulated mass of comminuted solid inert electronegative adsorption material held within an insulated induced electric field from analogous alternating currents and with an electrode from said field and passing beverage electrically connected to an insulated ground wire, having an interrupter automatically breaking earth connection with each positive alternation of each cycle of said alternating current; and after such passage, completing present process of manufacture and of packing only in insulated vessels and dielectric containers.

30. In the process of making wines, the process of passing the beverage under pressure rapidly within about a minute through a mass of comminuted solid dielectric adsorption material, in a dielectric tubular vessel surrounded by independent exciting wire coils exciting during said passage an induced electromagnetic field, within the vessel and passing beverage, under stress of electromagnetic induction created by exterior symmetrical alternating currents of low frequency and low voltage and strong amperage of a polyphase system, each of whose currents of different phase having an independent different circuit through different independent said exciting wire coils around said vessel, and arranged to create opposing induced currents, and alternations, in said induced field the induced maximum positive E. M. F. and alternation and charge induced in the beverage by the one circuit of one exciting coil meeting and counteracting in the beverage the equal maximum simultaneous negative E. M. F. and alternation and charge induced by the one or more other currents of the polyphase system in the other exciting coil or coils; and simultaneously attemperating the passing beverage to between 98° F. and 176° F.

31. The apparatus comprising two parallel insulated concentric long narrow dielectric cylindrical tubes separated by a narrow annular space and having the inner tube closed at bottom; a mass of comminuted solid inert dielectric non-magnetic adsorption material within said annular space; with perforated entrance- and exit-strainer plates at opposite ends of said annular space holding said adsorption material in said space; with an open-core step-down transformer having only one, a primary, wire coil and having its laminated core extending into and within said inner tube: and with an exciting solenoid encircling said outer tube; and with means of creating and transmitting through all said exciting and transformer coils, the same symmetrical alternating current preferably of low frequency and low voltage and moderate amperage; and with an inert solid electrode within said annular space beyond the adsorption material and electric field and electrically connected with a ground wire, having an interrupter automatically making and breaking earth connection in synchronism with each cycle of said alternating current; and with means of passing the beverage rapidly under low pressure from an insulated dielectric vessel into and through said annular space and adsorption material therein, when the said coils are carrying the said currents; and with means for attemperating the said adsorption material and the beverage while passing over same to between 98° F. and 176° F.; and with means for cleansing said adsorption material and annular space periodically.

32. The apparatus comprising an insulated vessel holding a mass of comminuted solid insoluble adsorption material; means for maintaining within said vessel, an electric field of force from alternating current source regulated as to voltage and frequency and amperage; and means for maintaining a passage therethrough and contact of liquids with such adsorption material and electric field at regulated pressure and temperature.

33. The apparatus comprising a narrow insulated vessel holding a mass of comminuted solid insoluble adsorption material; means for maintaining within said vessel, an induced electric field of force from alternating current source regulated as to voltage and frequency and amperage; and means for maintaining a passage therethrough and contact of, liquids with such adsorption material and electric field, at regulated pressure and temperature.

34. The apparatus comprising an insulated vessel holding a mass of comminuted solid electrically-acting adsorption material; means for maintaining a combination of electric fields independently within said vessel, from polyphase alternating current source, regulated as to voltage and frequency and amperage; means for maintaining a contact of liquids with the adsorption material in the electric field in the vessel at regulated pressure and temperature; means for electrically connecting the said liquids to earth through an interrupter, making and breaking earth connection in synchronism with each cycle of said current; means for conveying the liquids in dielectric piping into and from said vessel into dielectric receptacles; and means for periodically cleansing said vessel and adsorption material.

35. The apparatus comprising a chamber consisting of two insulated parallel vessels having a narrow space therebetween; with a mass of comminuted solid, inert, adsorption material in said chamber; means of passing the liquids under regulated pressure and at regulated temperature through said adsorption material and chamber under insulated conditions, and into connecting insulated receptacles; means for maintaining within said annular space, during said passing of the liquids, induced electric fields from alternating current source; and means for periodically cleansing said vessel and adsorption material.

36. In the making of beverages, including wines and the grapejuices used in the making, the apparatus comprising a vessel consisting of two concentric dielectric tubes with annular space between same holding a mass of comminuted solid dielectric, inert, adsorption material; means of passing the liquids under regulated pressure and at regulated temperature through said adsorption material under insulated conditions, and into connecting insulated receptacles; means for maintaining within said annular space, during said passing of the liquids, combined electromagnetic and electrostatic induced electric fields from alternating current source; means for electrically connecting the said liquid to earth through an exterior insulated interrupter making and breaking earth connection in synchronism with each cycle of said A. C.; and means for periodically cleansing said vessel and adsorption material.

37. An apparatus of the nature described, comprising a chamber holding a mass of suitable comminuted solid insoluble adsorption material, and means for maintaining in said chamber and mass an alternating electric field.

38. In the making of beverages including wines and the grape-juices used in the making, the apparatus comprising the combination of two long thin concentric dielectric tubes separated by a narrow annular space, the inner tube being closed at bottom; a metallic coating as an electrode upon inner surface of inner tube up to about one inch from top and bottom thereof and the outer tube having another metallic coating on its outer surface as an electrode opposite to and equal in length to inner electrode; remainder of said exterior and interior surfaces exclusive of the electrodes, covered by insulating material; the holding within said space of an insulated mass of finely comminuted solid inert adsorption material; means of passing the insulated beverage continuously through said annular space and adsorption material under low pressure; means for maintaining an insulated induced electric field within said annular space during said passage under the stress of electrostatic induction created by connecting the electrode of interior tube with the one terminal and the electrode of exterior tube with the other terminal of a symmetrical alternating current source of low voltage and amperage and of low frequency; and an inert solid electrode within said annular space above the adsorption material and electric field electrically connected with an insulated ground wire having an insulated interrupter automatically breaking and making said earth connection in synchronism with each cycle of said alternating current; means for attemperating the tubes and adsorption material while under said stress, to between 98° F. and 176° F.; means for cleansing said materials periodically.

39. The apparatus comprising the combination of a step-down alternating current closed core transformer whereof the primary windings of insulated wire carry a symmetrical alternating current of single phase preferably of low frequency of 16 cycles, and whereof the secondary winding consists of a tubular dielectric coil part of whose cavity incloses part of the closed core of the transformer; means of creating and transmitting said A. C. to said primary winding; a mass of comminuted solid inert adsorption material within said coiled tube; means of passing the beverage from an insulated vessel under low pressure into and through said coiled tube and adsorption material and into an insulated receiving vessel, while the primary winding carries said A. C.; with one inert solid alternate current; means for periodically cleansing said coil and material.

40. An apparatus of the nature described, comprising a chamber holding a mass of suitable comminuted solid insoluble dielectric adsorption material, means for effecting a flow of a beverage therethrough, and means for maintaining in said chamber and mass an alternating electric field.

41. An apparatus of the nature described, comprising an insulated chamber holding a mass of comminuted solid, inert, suitable adsorption material in a non-conducting container provided with inlet and outlet for a beverage, and means for maintaining in said chamber an induced alternating current field.

42. The apparatus comprising a dielectric insulated tube holding a mass of comminuted solid dielectric non-magnetic neutral adsorption material; separate exciting solenoid coils surrounding the tube; means of creating and passing through said separate wire coils, independent symmetrical alternating currents in opposite circuits, of low frequency and very high voltage and moderate amperage of a polyphase system from an A. C. generator, whereof each set of generating coils is connected up separately with separate pairs of collector rings supplying separate circuits leading to said exciting coils; means of passing the beverage from an insulated vessel under pressure rapidly through induced electric fields within said tube and surrounding said adsorption material which induced fields are created simultaneously by said opposite circuits of said exciting coils; means for attemperating said tube and material and passing beverage to any point between 98° F. and 176° F.; means for cleansing said tube and adsorption material.

43. As a new product a stabilized electrically charged beverage, containing therein with enhanced electric charges, colloidal constituents, non-adsorbable by a comminuted solid insoluble adsorption material under the influence of an alternating electric field, and being substantially free from colloidal constituents adsorbable by such material under such influence.

44. As a new product a beverage containing amphoteric colloidal constituents and substantially free from adsorbable colloidal constituents.

45. As a new product a beverage containing emulsoid colloidal constituents but substantially free from adsorbable suspensoid colloidal constituents.

46. As a new product an electrically charged beverage under insulated conditions containing amphoteric colloidal constituents and substantially free from adsorbable colloidal constituents.

47. As a new product, a wine, grapejuice, and the like, containing amphoteric colloidal constituents and substantially free from adsorbable colloidal constituents.

48. As a new product, a wine, grapejuice, and the like, containing amphoteric colloidal constituents carrying electric charges under insulated conditions and substantially free from adsorbable colloidal constituents.

49. As a new product, a beverage freed from suspensoid colloids and comprising emulsoid colloids electrically charged with adsorbed ions, under insulated conditions.

50. As a new product, a wine freed from turpidity-forming colloids and comprising emulsoid colloids electrically charged with adsorbed ions, under insulated conditions.

51. As a new product, a wine having emulsoid colloids in stable solution carrying enhanced electric charges under insulated conditions and freed from suspensoid colloids.

52. As a new product, a beverage containing in solution amphoteric colloids charged with electrically-adsorbed negative ions, under insulated conditions.

53. As a new product, a wine containing in solution amphoteric colloids charged with electrically-adsorbed negative ions, under insulated conditions.

54. A beverage including wine and grapejuice substantially electrically sterilized purified and clarified and in a stable state as regards sterilization purification and clarification, and endowed with electric charges and properties.

55. A sterilized beverage including wine and grapejuice additionally ionized and charged by combined frictional and inductional electrification.

Signed at city of New York in the county of New York and State of New York, this 25th day of May A. D. 1914.

JACOB E. BLOOM.

Witnesses:
DAVID FREIBERGER,
HENRY FREIBERGER.